Feb. 4, 1958  E. J. HOAGLAND  2,822,029
DIELECTRIC HEAT SEALING APPARATUS
Filed July 8, 1955  2 Sheets-Sheet 1
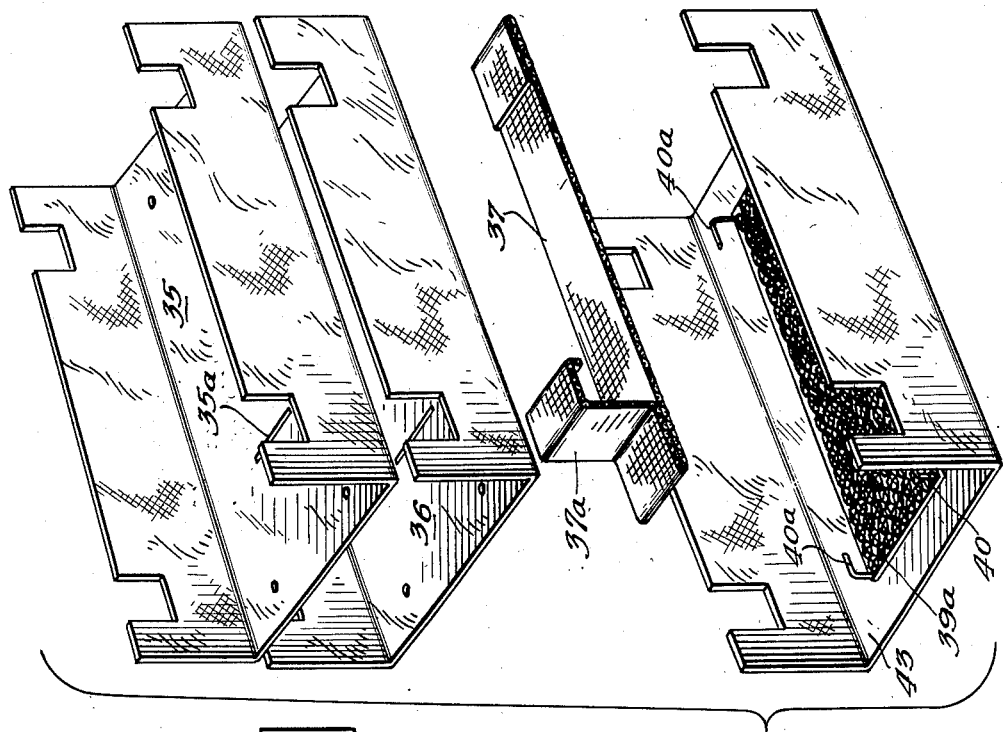
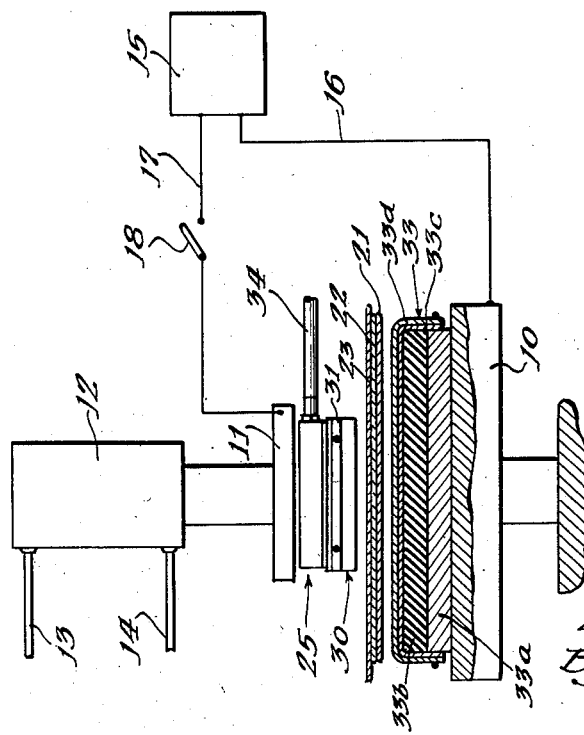
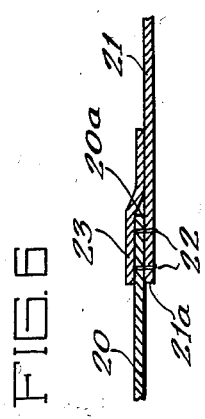
Inventor
Earl J. Hoagland
By Schroeder, Hofgren,
Brady & Wegner
Attorneys

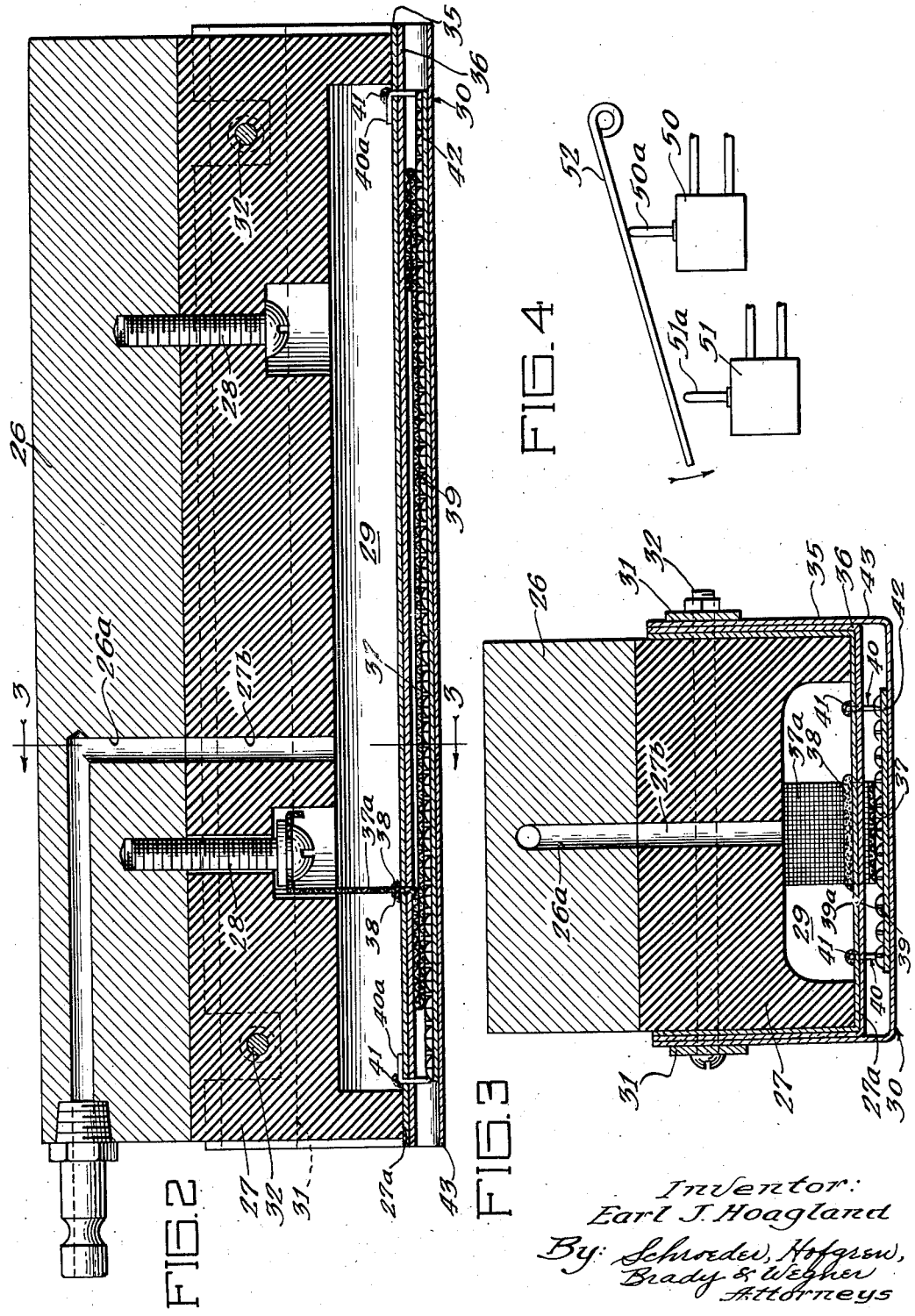

United States Patent Office 2,822,029
Patented Feb. 4, 1958

2,822,029
DIELECTRIC HEAT SEALING APPARATUS
Earl J. Hoagland, Chicago, Ill., assignor to Standard Safety Equipment Co., a corporation of Illinois
Application July 8, 1955, Serial No. 520,798
7 Claims. (Cl. 154—42)

This application relates to dielectric heat sealing apparatus and more particularly to a new and improved die for such apparatus.

Dielectric heat sealing presses generally utilize rigid, highly polished die members between which the materials to be sealed are pressed. It is difficult with such die members to obtain a good seal between materials of varying thickness.

The principal object of the present invention is to provide a novel die for sealing materials of varying thickness.

Another object is the provision of a die having a body with a cavity therein, a conformable, electrically conductive portion overlying the cavity for directing high frequency electrical energy through materials inserted between the die and the press plate, and means connected to the cavity for controlling the fluid pressure therein, causing the conformable portion to exert an even pressure on the materials being sealed. A further object is the provision of such a die in which the body is of an insulating material and the conformable portion has an electrically conductive area lying wholly within the cavity.

Another object is the provision of a die in which the cavity is open through a face of the body and the conformable portion includes a sheet of yieldable material extending across the cavity opening for sealed engagement with the die body around the periphery of the cavity when the press plates are moved toward each other.

The invention is illustrated in a preferred embodiment in the accompanying drawings, in which:

Fig. 1 is a diagrammatic view, partially in section, of the invention;

Fig. 2 is a vertical sectional view taken longitudinally through the die;

Fig. 3 is a vertical sectional view taken transversely through the die and substantially along line 3—3 thereof;

Fig. 4 is a diagrammatic view of the press and die control arrangement;

Fig. 5 is an exploded perspective view of the various sheets forming the conformable portion of the die; and Fig. 6 is a fragmentary sectional view of a seam before sealing.

Dielectric heat sealing apparatus has been used for some time for sealing together synthetic plastic sheet materials. Generally, the plates of a press are connected to the terminals of an electronic generator and the material to be sealed pressed between a die member affixed to the upper press plate and the lower or base plate of the press. While the materials are held in the press, the electronic generator is actuated, heating the materials as a result of the dielectric losses therein to such a temperature that the materials are fused together. The temperature needed depends, of course, on the material being sealed, but for most plastics is relatively low, in the range from 40° C. to 200° C. The dies presently in general use with such apparatus have a rigid, straight, highly polished sealing surface and the base plates of the presses similarly are rigid. Such apparatus is satisfactory where it is desired merely to seal together two materials which are of uniform thickness.

However, where it is desired to seal materials of irregular thicknesses, it is difficult to obtain a satisfactory result with a rigid die, even by making a large number of seals, which of course is a time-consuming, expensive operation.

Referring now to Fig. 1 of the drawings, a press having a rigidly mounted base plate 10 and a movable upper plate 11 is diagrammatically illustrated. Movement of the upper press plate 11 is effected through operation of a fluid pressure cylinder 12 provided with connections 13 and 14 to a suitable source of pressurized fluid, as compressed air (not shown). A high frequency generator 15 is provided with output leads 16 and 17, one of which is connected to base plate 10 and the other, through switch 18, to movable plate 11 of the press. Electronic generators for dielectric heat sealing operations generally operate within a frequency range of from 25–30 megacycles and have various power ratings depending upon the particular application.

Turning now to Fig. 6, two sheets of plastic-coated fabric material 20 and 21 are shown joined along their overlapping edges 20a and 21a by stitching 22. An impervious sheet is necessary for many applications and to provide this, the holes caused by stitching 22 must be sealed. The holes may be closed by sealing a strip of plastic material 23 over the stitched edges 20a and 21a of the sheets. The seal, however, must be complete across the entire width of the seam.

The die member, indicated generally as 25, includes a rigid metal base member 26, which may be of aluminum, and a die body 27 of an electrically insulating, yieldable resilient material, as rubber, secured to the base by a pair of machine screws 28. Cavity 29 is formed in the rubber block 27 and is open at the lower face 27a thereof. An electrically conductive conformable die portion indicated generally as 30, and comprising a plurality of sheets or layers which will be described in detail later, extends over the lower surface of die body 27 closing the open cavity 29; the conformable portion being secured to the body 27 by a pair of plates 31 extending longitudinally on either side thereof and held in place by bolts 32. A hose 34 is connected with a source of fluid under pressure (not shown) and communicates with cavity 29 through channels 26a and 27b provided in the base member and die body, respectively. The hose may also serve as a handle, facilitating manipulation of the die.

In practice, the materials to be sealed are inserted between the press plates (Fig. 1) and the die 25 placed on top of the seam to be sealed. Preferably, an auxiliary base plate 33 is utilized under the materials and comprising a metal base member 33a, a block 33b of very resilient material as sponge rubber and a covering including a conductive sheet 33c and a protective covering 33d of a plastic material such as Teflon, a tetrafluoroethylene plastic sold by E. I. du Pont de Nemours Co., Inc. After the die member 25 is properly positioned on the materials to be sealed, the upper press plate 11 is lowered. The force of the press, which may utilize a cylinder pressure of 60 p. s. i., serves to seal the conformable covering 30 to the lower face of resilient die body 27 around the periphery of cavity 29. Fluid under pressure, as air at 30 p. s. i., is then admitted to the cavity through channels 26a and 27b causing the conformable portion 30 to exert a substantially even pressure on the materials although they are of uneven thickness. Switch 18 is closed for a period of time directing high frequency electrical energy through the materials being sealed, causing heating due to dielectric losses and sufficient to cause the plastic materials to fuse together. The pressure may then be relieved in the cavity 29, the press opened and the sealed materials removed.

The conformable portion 30 which overlies the open cavity is illustrated in somewhat exaggerated form in Figs. 2 and 3 for the purpose of clarity. This portion includes first a sheet 35 of slightly yieldable, impervious material as a cotton fabric with a vinyl plastic coating thereon; and with the plastic coating turned inward in contact with the face 27a of the die body. Covering the yieldable sheet 35 is sheet 36 of a plastic material, such as Teflon, which serves as a heat insulator preventing the vinyl chloride coating of sheet 35 from melting during operation. A strip 37 of conductive material, as copper screening, overlies plastic sheet 36 and has an end portion 37a which extends through slits cut in sheets 35 and 36, through cavity 29 and is physically secured under the head of one of the machine screws 28 providing an electrical connection to conductive base member 26. The slit 35a in sheet 35 (Fig. 5) is sealed, as with a vinyl chloride cement 38.

Overlying the strip 37 of screening is a flexible sheet 39 of articulated metal plates 39a. (The sheet 39 may be a mesh-like material often used in making ladies' handbags.) Wires 40 extend longitudinally along either side of the flexible sheet 39 and have end portions 40a which project upwardly through sheets 35 and 36 to secure the sheet 39 thereto. The openings in sheet 35 through which the ends of the wires 40 project are also sealed with a vinyl chloride cement as indicated at 41. Overlying sheet 39 is a strip of adhesive tape 42, of a material capable of withstanding high temperatures, which holds the metal plates 39a in the proper relationship and prevents bunching. A protective cover sheet 43 extends over the entire assembly and is preferably a woven, glass fiber material having a coating of Teflon on the outer surface.

When switch 18 is closed, high frequency electrical energy passes through upper press plate 11, conductive die base member 26, machine screw 28 and conductive strip 37 to flexible sheet 39 from which it is directed through the metals to be sealed. It should be noted that both the sheet 39 and strip 37 lie wholly within the opening of cavity 29 so that the face 27a of the die body does not leave an impression on the materials being sealed. When the press is closed on the die, the conductive layers are actually forced upwardly inside the cavity opening. The woven texture of protective covering 43 imparts a pleasing design on the surface being sealed while the Teflon coating on the outer surface thereof prevents the softened plastic being sealed from sticking to the die.

As the conformable portion 30 is sealed around the lower face 27a of the die body, there is no tension placed on the edges of the various sheets secured under plates 31, by the admission of compressed air to the cavity, nor are these edges caused to balloon outwardly. This materially reduces the danger of a blow-out occurring.

To insure that the press plates will be closed before compressed air is admitted to die cavity 29, a sequential air control system, illustrated diagrammatically in Fig. 4, is used. Two valves, 50 and 51, provided with operating members 50a and 51a, control the admission of compressed air to the upper end of cylinder 12 and to the die cavity, respectively. A control member, as a foot pedal 52, is pivotally mounted above valves 50 and 51 and adapted for sequential engagement with operating arms 50a and 51a. The arrangement is such that as pedal 52 is depressed, valve 50 opens first, admitting air to cylinder 12 to lower upper press plate 11 and then valve 51 is opened admitting air to die cavity 29. When foot pedal 52 is released, the operation is reversed, pressure in cavity 29 being relieved before the press plates are opened.

The foregoing detailed description is given for clearness of understanding only and no unnecessary limitations should be understood therefrom, for some modifications will be obvious to those skilled in the art.

I claim:

1. In a dielectric heat sealing apparatus including a press having plates movable toward and away from each other and a source of high frequency electrical energy, a die arrangement for sealing materials of irregular thickness, comprising a die body having a cavity therein, a conformable, electrically conductive portion overlying said cavity for directing high frequency electrical energy through materials inserted between said die and one of the press plates, and means controlling the fluid pressure in said cavity, causing said conformable portion to exert an even pressure on said materials.

2. A die as specified in claim 1, wherein the die body includes a peripheral portion of an insulating material defining said cavity and the conformable portion has an electrically conductive area lying wholly within the peripheral portion of the die body.

3. In a dielectric heat sealing apparatus including a press having plates movable toward and away from each other and a source of high frequency electrical energy, a die arrangement for sealing materials of irregular thickness, comprising a die body having a cavity therein open through a face of the body, a conformable, electrically conductive portion overlying the opening to said cavity for directing high frequency electrical energy through materials inserted between said die and one of the press plates, and a source of fluid under pressure connected to said cavity for filling the cavity, causing said conformable portion to exert an even pressure on said materials.

4. A die as specified in claim 3, wherein the conformable portion includes a sheet of yieldable material extending across the cavity opening for sealed engagement with the face of the die body around the periphery of the cavity opening when the press plates are moved toward each other.

5. In a dielectric heat sealing apparatus including a press having plates movable toward and away from each other and a source of high frequency electrical energy, a die ararngement for use in sealing materials of irregular thickness, comprising an electrically conductive base member, a resilient, insulating die body having a cavity therein opening through a face of the body; a yieldable sheet extending across the opening of the cavity for sealed engagement with the face of the die body around the periphery of the cavity when the press plates are moved toward each other, an electrically conductive layer carried by said yieldable sheet and lying wholly within the periphery of the opening of said cavity for directing high frequency electrical energy through materials inserted between said die and one of the press plates, and a source of fluid under pressure connected to said cavity for filling the cavity, causing the exertion of an even pressure on said materials.

6. A die as specified in claim 5, wherein an electrical connection between the conductive layer and the base extends through said cavity.

7. In a dielectric heat sealing apparatus, including a fluid-operated press having plates movable toward and away from each other, a source of high frequency electrical energy, a die arrangement for use in sealing materials of irregular thickness comprising a die body having a cavity therein, a conformable, electrically conductive portion overlying the cavity for directing high frequency electrical energy through materials inserted between the die and one of the press plates, a source of fluid under pressure connected to said press for causing relative movement of said plates and to said cavity for filling the cavity with fluid under pressure causing said conformable portion to exert an even pressure on said materials, valves for individually controlling the application of fluid under pressure to the press and to the die, and an operating member for sequentially opening said valves whereby the press plates are moved toward each other before the fluid is admitted to said cavity.

References Cited in the file of this patent

UNITED STATES PATENTS

| | | |
|---|---|---|
| 2,466,735 | Piazze | Apr. 12, 1949 |
| 2,646,105 | Langer | July 21, 1953 |